I. FILES.
TRAP SETTING DEVICE.
APPLICATION FILED MAR. 20, 1920.
1,358,141. Patented Nov. 9, 1920.
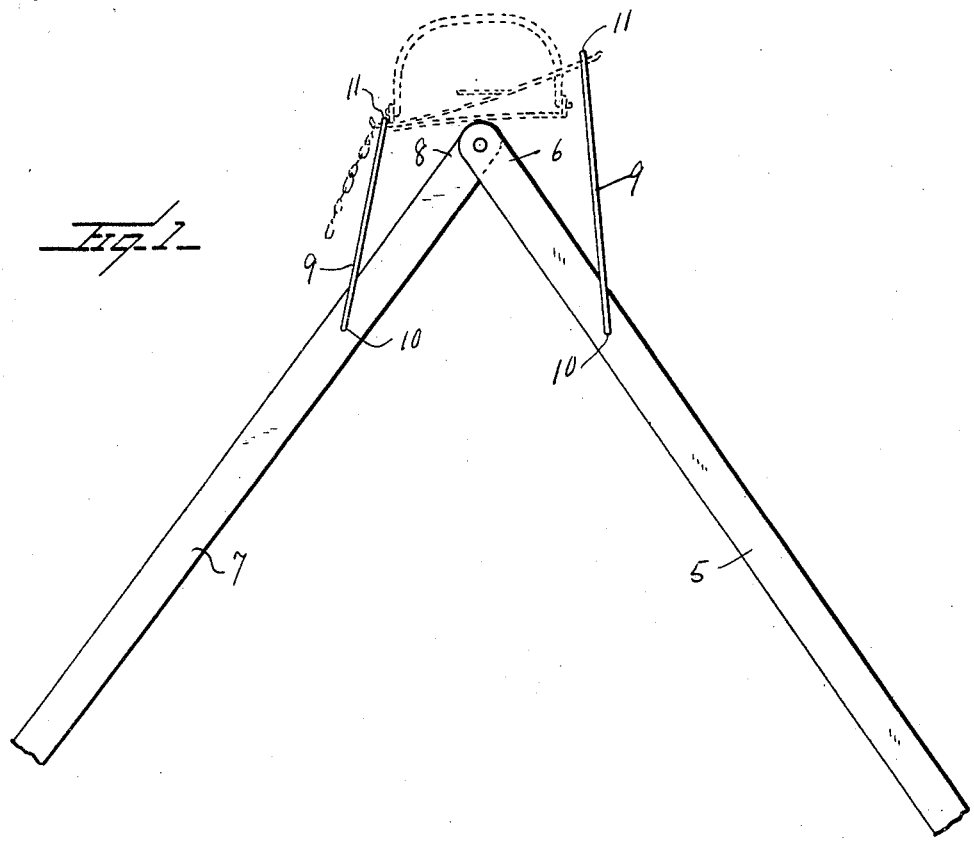
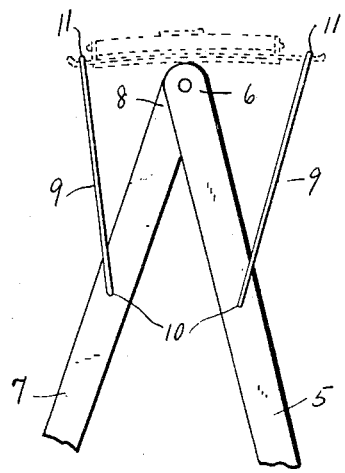
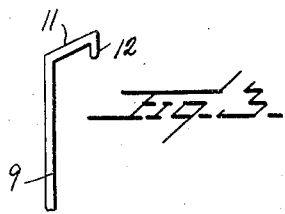
Inventor
I. Files

UNITED STATES PATENT OFFICE.

IVAN FILES, OF WATERVILLE, MAINE.

TRAP-SETTING DEVICE.

1,358,141.  Specification of Letters Patent.  Patented Nov. 9, 1920.

Application filed March 20, 1920. Serial No. 367,358.

*To all whom it may concern:*

Be it known that I, IVAN FILES, a citizen of the United States, residing at Waterville, in the county of Kennebec and State of Maine, have invented certain new and useful Improvements in Trap-Setting Devices, of which the following is a specification, reference being had to the accompanying drawings.

This invention relates to trap setting devices and has for its object to provide a device of this character capable of compressing the springs of single or double spring traps, and traps of various types.

Another object is to provide a device of this character capable of compressing a single or double spring trap regardless of the position of the spring.

Another object is to provide a device of this character which permits the setting of a trap without causing the operator to touch the trap or the animal held by the trap.

A still further object is to provide a device of this character wherein the operating levers engage and force the trap outwardly and permit the spring engaging means to draw the spring inwardly so as to prevent disengagement of the holding means from the spring during the setting operation.

With these and other objects in view, the invention consists in the improved construction and arrangement of parts to be hereinafter more particularly described, fully claimed, and illustrated in the accompanying drawings, in which:

Figure 1 is a plan view of a trap setting device constructed in accordance with the invention, and showing the position of the device before the spring is compressed, Fig. 2 is a fragmentary view of the device showing the position of the arms after the spring has been compressed; and Fig. 3 is a detail view of the spring engaging jaw of the arm.

Referring to the drawings, 5 indicates a lever having a rounded end 6. A lever 7 having a rounded end 8 is pivoted to the rounded end 6 of the lever 5, the rounded ends of each lever coinciding with the rounded end of the adjacent lever. The rounded ends are intended to engage the base of the trap and thereby serve as supporting means.

Spring engaging arms 9 are provided, one of these arms being pivoted to each lever as at 10. The other end 11 of the arm projects beyond the ends 6 and 8 of the lever and is extended in right angular relation to the arm 9 and in right angular relation to the ends 6 and 8. The extremity 12 of the end 11 is disposed in right angular relation to said end 11. By this means a jaw is provided adapted to engage the spring of the trap.

In use of the device, the levers 5 and 7 are moved away from each other so as to permit the arms 9 to extend forwardly and easily engage the ends of the spring or springs, the springs being disposed in the jaws of the arms. Upon movement of the levers toward each other, the rounded ends 6 and 8 thereof will be forced into engagement with the base of the trap, the round ends permitting said levers to move toward each other, while engaged with the trap.

During this movement of the levers toward each other, the arms 9 are drawn inwardly and toward the operator, thereby drawing the spring toward the base which is forced outwardly by the rounded ends. By this means, a fulcrum is provided for the arms 9, which permits the arms to efficiently engage the spring without danger of the same accidentally slipping therefrom, and in this manner the spring is compressed and held, while the jaws of the trap are set or the animal removed from the trap.

From the foregoing it will be readily seen that this novel trap setting device not only permits the trap to be quickly set, but eliminates the danger of the operator's hand being caught in the trap in addition to permitting the animal to be easily removed.

The invention having been set forth, what is claimed as new and useful is:—

1. A trap setting device comprising a pair of levers one end of each being rounded and pivoted at their rounded end to each other, an arm pivoted at one end to each lever adjacent the connected ends of the levers, the other end of each arm being formed into a jaw adapted to engage a spring of a trap, said rounded ends of the levers engaging the trap, whereby said trap is forced outwardly while the spring is being drawn inwardly when the free ends of the levers are moved toward each other to permit setting of the jaws of the trap.

2. A trap setting device comprising a pair of levers pivoted at one of their ends to each other, said levers being disposed in angular relation to each other at all times, a rigid arm pivoted at one end to each lever, said arm extending beyond the pivoted ends of said levers, the opposite end of each arm being extended in right angular relation thereto to provide a hook for engagement with the spring of a trap, whereby the spring is compressed according to the movement of said levers toward each other.

In testimony whereof I hereunto affix my signature.

IVAN FILES.